(12) United States Patent
Wang (10) Patent No.: US 9,959,282 B2
(45) Date of Patent: May 1, 2018

(54) METHOD, APPARATUS, AND ELECTRONIC DEVICE FOR FILE MANAGEMENT

(71) Applicant: TENCENT TECHNOLOGY (SHENZHEN) COMPANY LIMITED, Shenzhen (CN)

(72) Inventor: Junming Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 699 days.

(21) Appl. No.: 14/591,132

(22) Filed: Jan. 7, 2015

(65) Prior Publication Data

US 2015/0120789 A1 Apr. 30, 2015

Related U.S. Application Data (63) Continuation of application No. PCT/CN2014/075790, filed on Apr. 21, 2014.

(30) Foreign Application Priority Data

Jun. 6, 2013 (CN) .......................... 2013 1 0223252

(51) Int. Cl.
*G06F 17/30* (2006.01)
*G06F 3/0488* (2013.01)
(Continued)

(52) U.S. Cl.
CPC .... *G06F 17/30126* (2013.01); *G06F 3/04817* (2013.01); *G06F 3/04842* (2013.01); *G06F 3/04883* (2013.01); *G06F 17/30117* (2013.01)

(58) Field of Classification Search
CPC ........... G06F 17/30126; G06F 3/04817; G06F 3/04842; G06F 3/04883; G06F 17/30117
(Continued)

(56) References Cited

U.S. PATENT DOCUMENTS

| 8,954,887 | B1* | 2/2015 | Tseng | G06F 3/04812 715/808 |
| 2012/0052918 | A1* | 3/2012 | Yang | G06F 3/04817 455/566 |
| 2014/0331187 | A1* | 11/2014 | Hicks | G06F 3/0488 715/845 |

FOREIGN PATENT DOCUMENTS

| CN | 101770326 A | 7/2010 |
| CN | 101796478 A | 8/2010 |

(Continued)

OTHER PUBLICATIONS

The State Intellectual Property Office of the People's Republic of China (SIPO) Office Action 1 for 201310223252.6 dated Feb. 4, 2015 9 Pages (including translation).

*Primary Examiner* — Evan Aspinwall (74) *Attorney, Agent, or Firm* — Anova Law Group, PLLC (57) ABSTRACT

Methods, apparatus, and electronic devices for file management are provided. On a touch screen, whether a duration time of a first pre-set operation to a target file is greater than a first pre-set threshold value can be detected. When the duration time of the first pre-set operation to the target file is detected greater than the first pre-set threshold value, the target file, and other files related to the target file and on an interface of the target file can be determined as files to be managed. According to a second pre-set operation to the files to be managed, a corresponding management to the files to be managed can be performed.

18 Claims, 7 Drawing Sheets

(51) Int. Cl.
*G06F 3/0481* (2013.01)
*G06F 3/0484* (2013.01)

(58) Field of Classification Search
USPC .......................................................... 707/700
See application file for complete search history.

(56) References Cited

FOREIGN PATENT DOCUMENTS

| CN | 102368199 A | 3/2012 |
| CN | 102929540 A | 2/2013 |

\* cited by examiner

METHOD, APPARATUS, AND ELECTRONIC DEVICE FOR FILE MANAGEMENT

CROSS-REFERENCES TO RELATED APPLICATIONS

This application is a continuation application of PCT Patent Application No. PCT/CN2014/075790, filed on Apr. 21, 2014, which claims priority to Chinese Patent Application No. CN2013102232526, filed on Jun. 6, 2013, the entire contents of which are incorporated herein by reference.

FIELD OF THE DISCLOSURE

The present disclosure relates to the field of computer technology and, more particularly, relates to methods, apparatus, and electronic devices for file management.

BACKGROUND

Electronic devices having touch screens (e.g., smart phones and tablet computers) usually allow a user to manage files displayed on the touch screen by touch operations. On the touch screen of the electronic devices, the files are often displayed as an icon.

Figure 1:
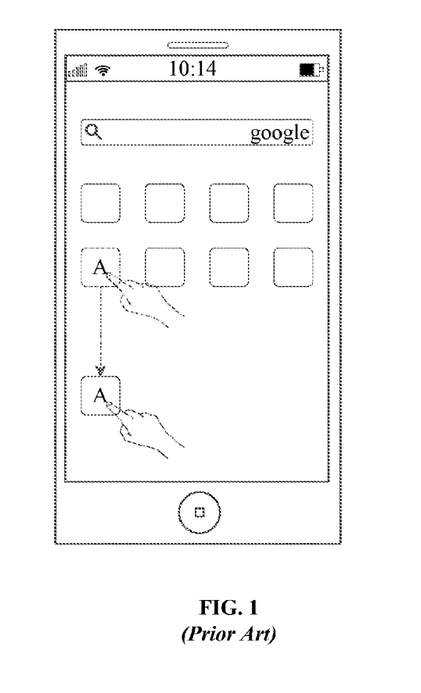
FIG. 1 depicts a conventional method for file management.

FIG. 1 shows a conventional file managing operation. As shown in FIG. 1, to move a position of the icon displayed on the touch screen, for example, when a user moves an icon on the touch screen, the user can long-press an icon A on the touch screen. When the electronic device detects that the time duration for the long press on the position of icon A exceeds a predetermined threshold value, the electronic device can control the icon A on a pre-editing state. In this case, according to a sliding operation on the touch screen by the user, the electronic device can move the position of icon A. Similar processes can be performed to move icon A into a folder or another desktop.

In conventional methods of managing files on the touch screen, a user can only manage one file at a time. When multiple files need a same managing operation on a current interface, multiple operations need to be repeated one after another, which wastes a lot of time.

BRIEF SUMMARY OF THE DISCLOSURE

One aspect of the present disclosure includes a file managing method. On a touch screen, whether a duration time of a first pre-set operation to a target file is greater than a first pre-set threshold value can be detected. When the duration time of the first pre-set operation to the target file is detected greater than the first pre-set threshold value, the target file, and other files related to the target file and on an interface of the target file can be determined as files to be managed. According to a second pre-set operation to the files to be managed, a corresponding management to the files to be managed can be performed.

Another aspect of the present disclosure includes a file managing apparatus. The apparatus can include a first detecting module, a first determining module, and a managing module. The first detecting module can be configured to detect whether a duration time of a first pre-set operation to a target file is greater than a first pre-set threshold value. The first determining module can be configured, when the first detecting module detects that the duration time of the first pre-set operation to the target file is greater than the first pre-set threshold value, to determine the target file, and other files related to the target file and on an interface of the target file, as files to be managed. The managing module can be configured to perform a corresponding management to the files to be managed, according to a second pre-set operation to the files to be managed. An electronic device including the apparatus can also be included.

Another aspect of the present disclosure includes a non-transitory computer-readable medium having computer program. When being executed by a processor, the computer program performs a file managing method. The method includes detecting whether a duration time of a first pre-set operation to a target file is greater than a first pre-set threshold value and, when the duration time of the first pre-set operation to the target file is detected greater than the first pre-set threshold value, determining the target file, and other files related to the target file and on an interface of the target file, as files to be managed. The method also includes performing a corresponding management to the files to be managed according to a second pre-set operation to the files to be managed.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 2:
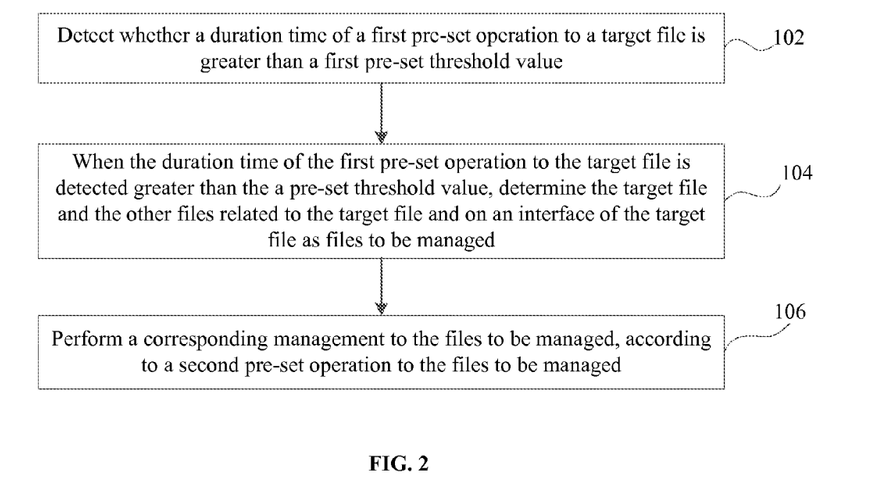
FIG. 2 is a flow chart of an exemplary method of file management in accordance with various disclosed embodiments.

FIG. 2 depicts an exemplary method of file management in accordance with various disclosed embodiments. The exemplary file managing method can be used for electronic devices having a touch screen to perform managing operations to files displayed on the touch screen.

In Step 102, it is detected whether a duration time of a first pre-set operation to a target file is greater than a first pre-set threshold value.

In Step 104, when the duration time of the first pre-set operation to the target file is detected greater than the first pre-set threshold value, it is determined the target file and other files related to the target file and on a same interface of the target file as files to be managed.

In Step 106, a corresponding management can be performed to the files to be managed, according to the second pre-set operation for treating the files to be managed.

As disclosed, on a touch screen, whether a duration time of a first pre-set operation to a target file is greater than a first pre-set threshold value can be detected. When the duration time of the first pre-set operation to the target file is detected greater than the first pre-set threshold value, the target file, and other files related to the target file and on an interface of the target file can be determined as files to be managed. According to a second pre-set operation to the files to be managed, a corresponding management to the files to be managed can be performed. The disclosed embodiments can solve problems that multiple operations need to be repeated one after another, when multiple files need a same managing operation on a current interface. The disclosed embodiments can reduce operations and operational time of the user on the touch screen.

Figure 3:
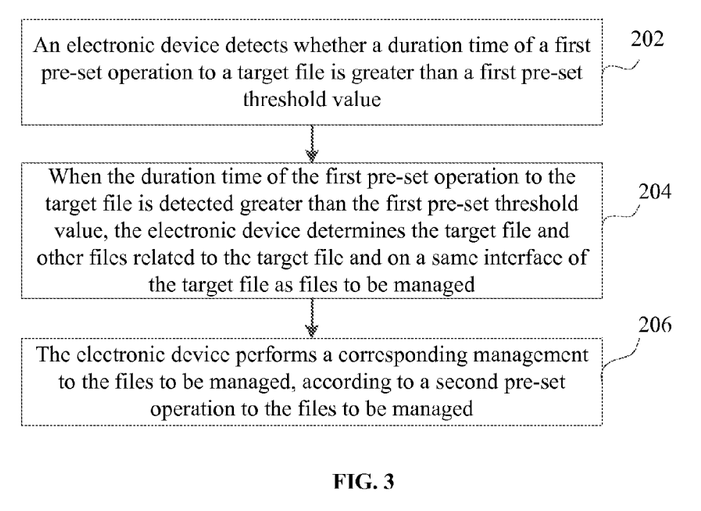
FIG. 3 is a flow chart of another exemplary method of file management in accordance with various disclosed embodiments.

FIG. 3 depicts an exemplary method of file management in accordance with various disclosed embodiments. The exemplary file managing method can be used for electronic devices having a touch screen to perform managing operations to files displayed on the touch screen.

In Step 202, the electronic device detects whether a duration time of a first pre-set operation to a target file is greater than a first pre-set threshold value.

The electronic device can be any device having a touch screen including, e.g., smartphones, tablet computers, and/or other suitable devices. The first pre-set operation can be, e.g., a touching operation or a hovering operation. For example, a finger, a stylus, or any other suitable object can touch an icon displayed on the touch screen or can hover above the icon displayed on the touch screen.

In Step 204, when the duration time of the first pre-set operation to the target file is detected greater than the first pre-set threshold value, the electronic device determines the target file and other files related to the target file and on a same interface of the target file as files to be managed.

In various embodiments, the other files related to the target file can include, for example, other files that are at a same row of the target file; other files that are at a same column of the target file; other files that are at a same group of the target file; and/or other files having a same type of the target file.

In one embodiment, the electronic device can further detect whether the duration time of the first pre-set operation to the target file is greater than a second pre-set threshold value and less than the first pre-set threshold value. When it is detected that the duration time of the first pre-set operation to the target file is detected greater than the second pre-set threshold value and less than the first pre-set threshold value, the electronic device can determine the target file as the files to be managed. The first pre-set threshold value can be greater than the second pre-set threshold value.

Figure 4:
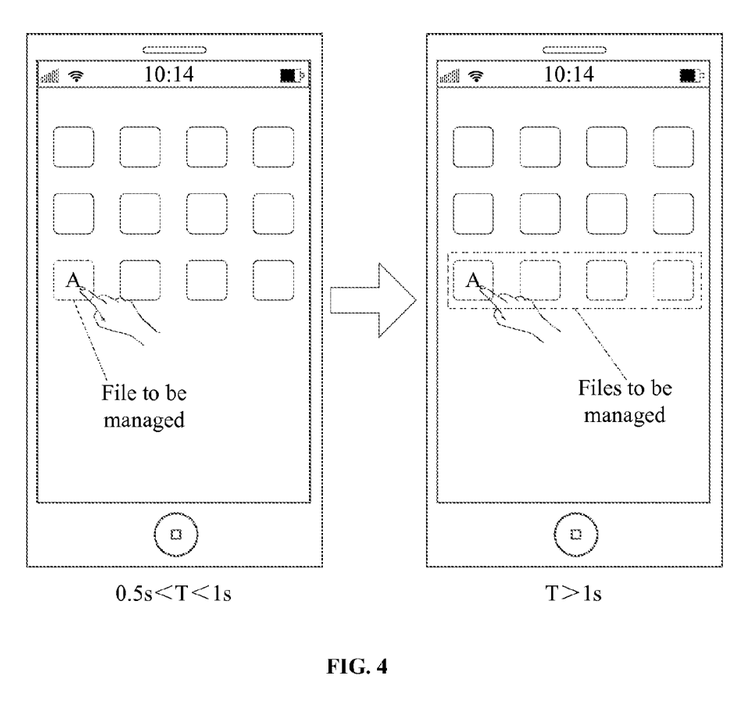
FIG. 4 is a schematic illustrating determination of a file to be managed in accordance with various disclosed embodiments.

In an example that the other files related to the target file include other files that are at a same row of the target file, FIG. 4 depicts a schematic for determining a file to be managed. For example, a first pre-set threshold value can be, e.g., about 1 second and a second pre-set threshold value can be, e.g., about 0.5 second. The electronic device can detect the duration time T of the touch operation on the target file A by a user. When 0.5 s<T<1 s is detected, only the file A can be determined as the file to be managed. When T>1 s is detected, the file A, and all the files that are at the same row of the target file can be determined as the files to be managed.

In addition, the electronic device can further detect whether the duration time of the first pre-set operation to the target file is greater than the third pre-set threshold value. When it is detected that the duration time of the first pre-set operation to the target file is greater than the third pre-set threshold value, the electronic device can determine the target file as the files to be managed. The first pre-set threshold value is less than the third pre-set threshold value.

Figure 5:
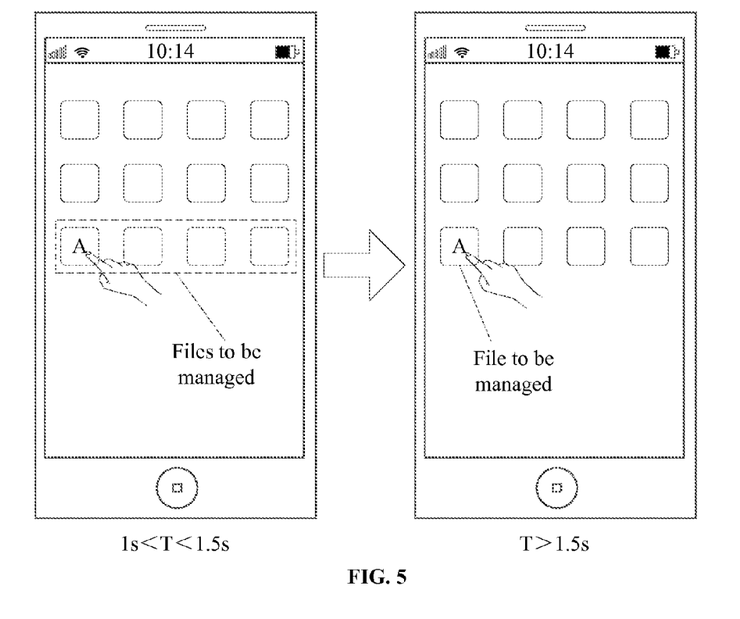
FIG. 5 is another schematic illustrating determination of a file to be managed in accordance with various disclosed embodiments.

In an example that the other files related to the target file include other files that are at a same row of the target file, FIG. 5 depicts another schematic for determining a file to be managed. For example, a first pre-set threshold value can be, e.g., about 1 second and a third pre-set threshold value can be, e.g., about 1.5 seconds. The electronic device can detect the duration time T of the touch operation on the target file A by a user. When 1 s<T<1.5 s is detected, only the file A can be determined as the file to be managed. When T>1 s is detected, the file A, and all the files that are at the same row of the target file (e.g., file A) can be determined as the files to be managed.

In Step 206, the electronic device performs a corresponding management to the files to be managed, according to a second pre-set operation to the files to be managed. In one embodiment, the second pre-set operation can include operations of moving, deleting, and/or renaming.

The second pre-set operation can be an operation performed uninterruptedly and immediately after the first pre-set operation is performed. In order to be conveniently recognized by the electronic device, the first pre-set operation and the second pre-set operation can be set as two different operations. For example, the first pre-set operation can be a long-press operation, and the second pre-set operation can be a drag operation. After the icon of the target file is long-pressed by finger or other objects, the touch screen can remain touched with sliding operation to drag the position of the icon of the file to be managed.

Alternatively, the second pre-set operation and the first pre-set operation can be performed interruptedly. For example, after the icon of the target file is long-pressed by a finger, the finger can move away from the touch screen. After a period of time elapsed, the finger can re-touch the touch screen and slide to drag a position of the icon of the file to be managed.

Figure 6:
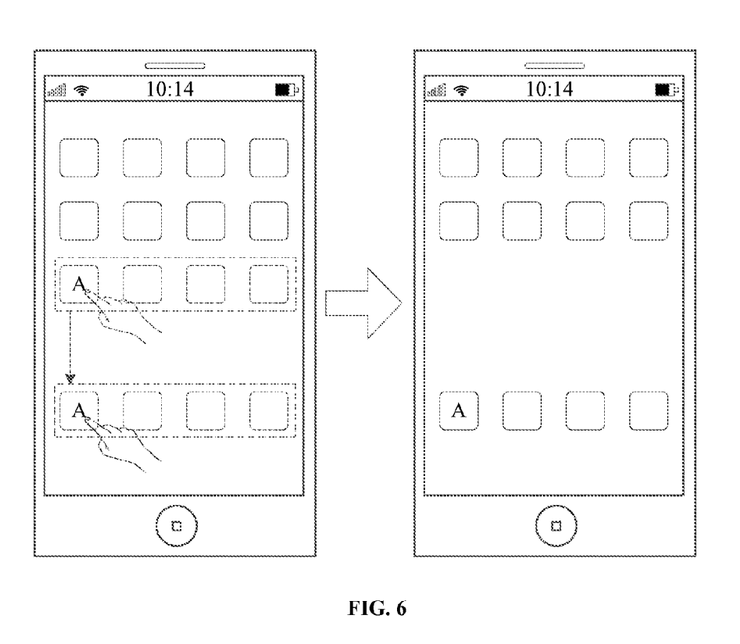
FIG. 6 is a schematic illustrating a moving operation of a file to be managed in accordance with various disclosed embodiments.

The electronic device can move a position of a portion or all of the files from the files to be managed, according to a moving operation performed to the files to be managed. For example, the first pre-set operation can be a touching operation, and the files to be managed can include the target file and the other files that are at a same row of the target file. FIG. 6 is a schematic illustrating a moving operation of the files to be managed. After the electronic device determines icons of all other files that are at the same row of the target file A are files to be managed, icons of all other files at the same row of the target file A can be on a pre-editing state. In this case, a finger of the user can maintain touching the touch screen and sliding a position of the finger; and the electronic device can control a position of icons of all other files at the same row of the target file A to move along the sliding operation of the user. When the electronic device detects that the finger moves away from the touch screen, the electronic device determines an accomplishment of the moving operation of the files to be managed. The files to be managed can then re-enter a non-editable status.

Figure 7:
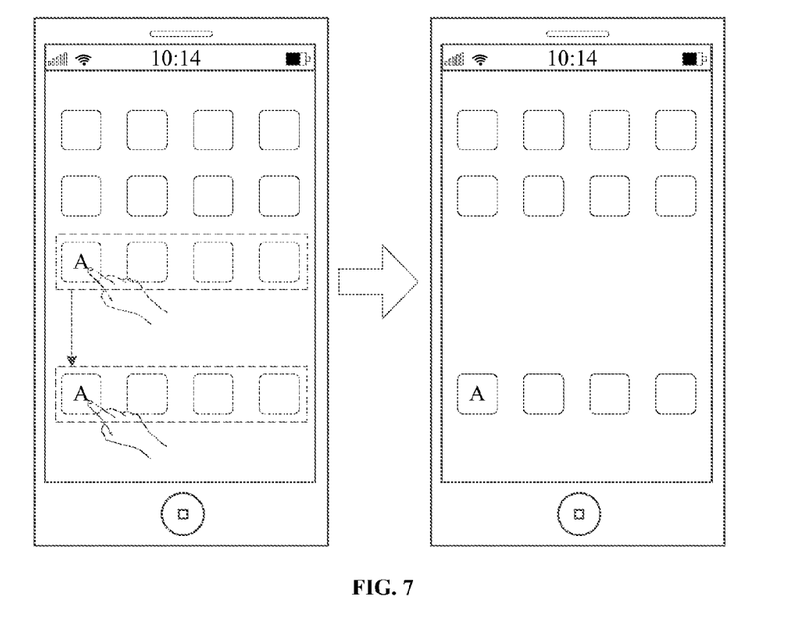
FIG. 7 is another schematic illustrating a moving operation of a file to be managed in accordance with various disclosed embodiments.

In addition, the user can select to move icons of a portion of the files to be managed. For example, the first pre-set operation can be a touching operation, and the files to be managed can include the target file and the other files that are at a same row of the target file. FIG. 7 is a schematic illustrating another moving operation of the files to be managed. After the electronic device determines icons of all other files that are at the same row of the target file A are files to be managed, icons of all other files at the same row of the target file A can be on a pre-editing state. In this case, when the finger of the user moves away from the touch screen, all other files at the same row of the target file A can still be on the pre-editing state. When the user touches a file B at a same row of the target file A and slide the finger, the electronic device can control a position of the file B to move along the sliding operation of the user. When the electronic device detects that the finger moves away from the touch screen, the ion of the file B stop moving and maintains on the pre-editing state. When the user touches or taps other positions on the touch screen, the electronic device determines that the moving operation of the files to be managed is complete. All files to be managed can then re-enter a non-editable status.

Figure 8:
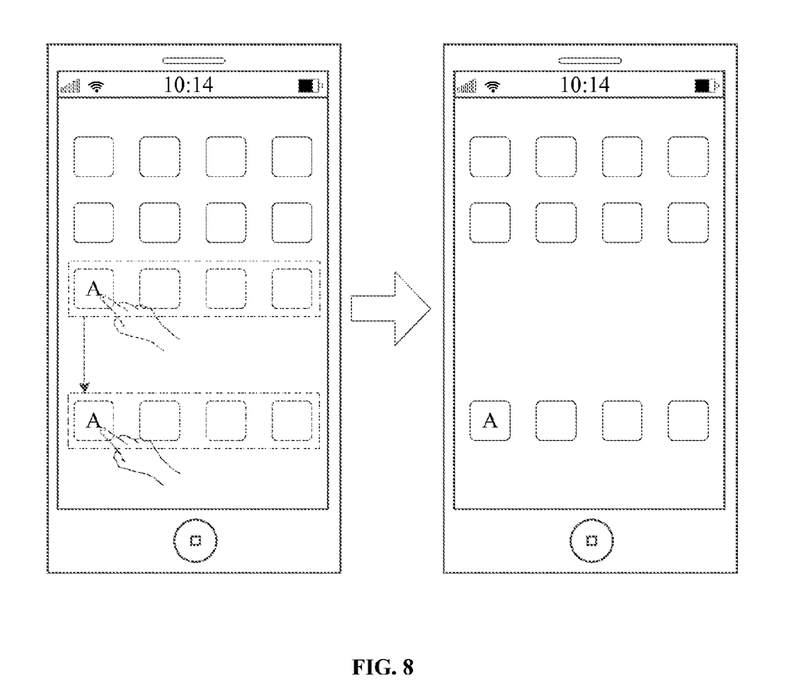
FIG. 8 is a schematic illustrating a deleting operation of a file to be managed in accordance with various disclosed embodiments.

Alternatively, the electronic device can delete a portion or all of the files from the files to be managed, according to a deleting operation to the files to be managed. For example, the first pre-set operation can be a touching operation, and the files to be managed can include the target file and the other files that are at a same row of the target file. FIG. 8 is a schematic illustrating a deleting operation of the files to be managed. After the electronic device determines icons of all other files that are at the same row of the target file A are files to be managed, icons of all other files at the same row of the target file A can be on a pre-editing state. In this case, after the finger of the user moves away from the touch screen, all (other) files at the same row of the target file A can still be on the pre-editing state. When the user touches or taps a deleting marking on top right corner of the icon of file B in the files to be managed, the electronic device can delete the file B. When the user touches or taps other positions on the touch screen, the electronic device can determine that the files to be managed have been deleted and all undeleted files in the files to be managed enter a non-editable state. In real practice, the electronic device can use other suitable operations to delete file B as desired. For example, the files to be managed can be deleted by being dragged into an icon of a recycle bin. The deleting operations disclosed herein are not limited.

Figure 9:
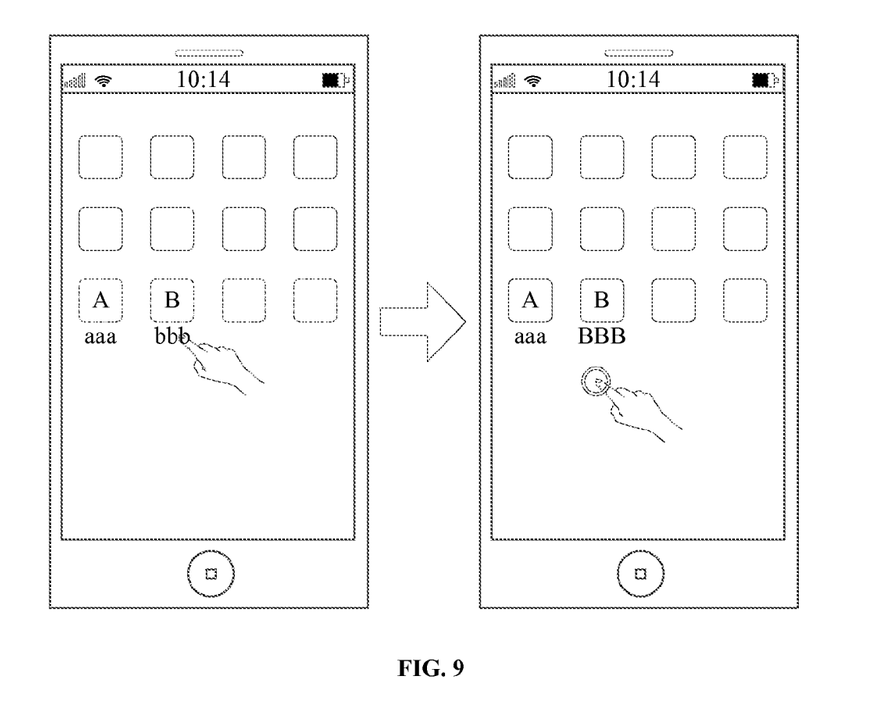
FIG. 9 is a schematic illustrating a renaming operation of a file to be managed in accordance with various disclosed embodiments.

Alternatively, the electronic device can rename a portion or all of the files from the files to be managed, according to a renaming operation to the files to be managed. For example, the first pre-set operation can be a touching operation, and the files to be managed can include the target file and the other files that are at a same row of the target file. FIG. 9 is a schematic illustrating a renaming operation of the files to be managed. After the electronic device determines icons of all other files that are at the same row of the target file A are files to be managed, icons of all other files at the same row of the target file A can be on a pre-editing state. In this case, after the finger of the user moves away from the touch screen, all (other) files at the same row of the target file A can still be on the pre-editing state. When the user touches or taps a name position under the icon of file B in the files to be managed, the electronic device can pop out an input interface for the user to input a new name. When the user touches or taps other positions on the touch screen, the electronic device can determine that the files to be managed have been renamed and all files to be managed can enter a non-editable state.

As disclosed, on a touch screen, whether a duration time of a first pre-set operation to a target file is greater than a first pre-set threshold value can be detected. When the duration time of the first pre-set operation to the target file is detected greater than the first pre-set threshold value, the target file, and other files related to the target file and on an interface of the target file can be determined as files to be managed. According to a second pre-set operation to the files to be managed, a corresponding management to the files to be managed can be performed. The disclosed embodiments can solve problems that multiple operations need to be repeated one after another, when multiple files need a same managing operation on a current interface. The disclosed embodiments can reduce operations and operational time of the user on the touch screen.

Figure 10:
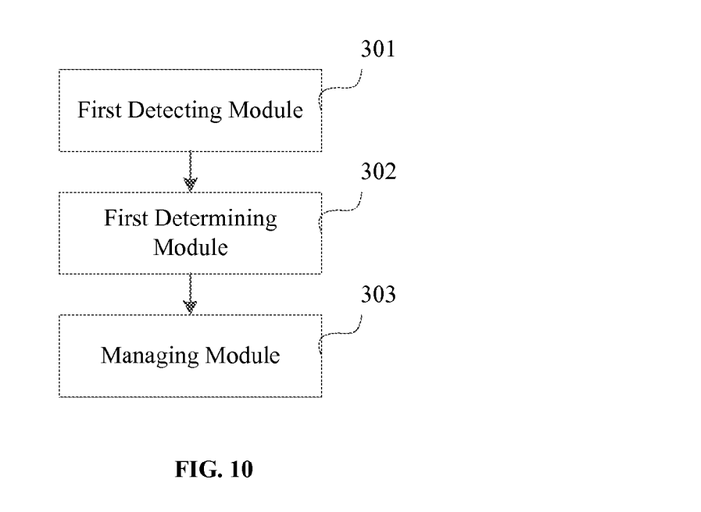
FIG. 10 depicts an exemplary apparatus of file management in accordance with various disclosed embodiments.

FIG. 10 depicts an exemplary apparatus of file management in accordance with various embodiments. The exemplary apparatus for file management can be used for electronic devices having a touch screen to perform managing operations to files displayed on the touch screen. The exemplary apparatus can include a first detecting module 301, a first determining module 302, and/or a managing module 303.

The first detecting module 301 is configured to detect whether a duration time of a first pre-set operation to a target file is greater than a first pre-set threshold value.

The first determining module 302 is configured, when the duration time of the first pre-set operation to the target file is detected greater than the first pre-set threshold value by the first detecting module 301, to determine the target file and other files related to the target file on an interface of the target file as files to be managed.

The managing module 303 is configured to perform a corresponding management to the files to be managed, according to a second pre-set operation to the files to be managed.

As disclosed, on a touch screen, whether a duration time of a first pre-set operation to a target file is greater than a first pre-set threshold value can be detected. When the duration time of the first pre-set operation to the target file is detected greater than the first pre-set threshold value, the target file, and other files related to the target file and on an interface of the target file can be determined as files to be managed. According to a second pre-set operation to the files to be managed, a corresponding management to the files to be managed can be performed. The disclosed embodiments can solve problems that multiple operations need to be repeated one after another, when multiple files need a same managing operation on a current interface. The disclosed embodiments can reduce operations and operational time of the user on the touch screen.

Figure 11:
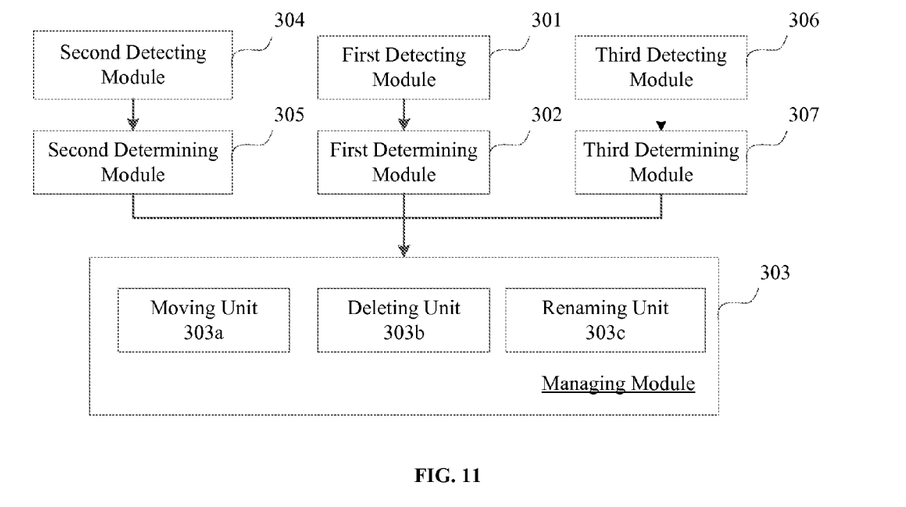
FIG. 11 depicts another exemplary apparatus of file management in accordance with various disclosed embodiments.

FIG. 11 depicts another exemplary apparatus of file management in accordance with various embodiments. The exemplary apparatus for file management can be used for electronic devices having a touch screen to perform managing operations to files displayed on the touch screen. The exemplary apparatus includes a first detecting module 301, a first determining module 302, and/or a managing module 303.

The first detecting module 301 is configured to detect whether a duration time of a first pre-set operation to a target file is greater than a first pre-set threshold value.

The first determining module 302 is configured, when the duration time of the first pre-set operation to the target file is detected greater than the first pre-set threshold value by the first detecting module 301, to determine the target file and other files related to the target file and on the interface of the target file as files to be managed.

The managing module 303 is configured to perform a corresponding management to the files to be managed, according to a second pre-set operation to the files to be managed.

In addition, the exemplary apparatus further includes a second detecting module 304, and/or a second determining module 305.

The second detecting module 304 is configured to detect whether the duration time of the first pre-set operation to the target file is greater than a second pre-set threshold value and less than the first pre-set threshold value.

The second determining module 305 is configured, when the duration time of the first pre-set operation to the target file is detected greater than the second pre-set threshold value and less than the first pre-set threshold value by the second detecting module 304, to determine the target file as the files to be managed. The first pre-set threshold value is greater than the second pre-set threshold value.

The exemplary apparatus further includes a third detecting module 306, and/or a third determining module 307.

The third detecting module 306 is configured to detect whether the duration time of the first pre-set operation to the target file is greater than a third pre-set threshold value.

The third determining module 307 is configured, when the duration time of the first pre-set operation to the target file is detected greater than the third pre-set threshold value by the third detecting module 306, to determine the target file as the files to be managed. The first pre-set threshold value is less than the third pre-set threshold value.

The other files related to the target file on a current interface include other files that are at a same row of the target file, other files that are at a same column of the target file, other files that are at a same group of the target file, and/or other files having a same type of the target file. The second pre-set operation includes moving, deleting, or renaming.

The managing module 303 includes a moving unit 303a, a deleting unit 303b, and/or a renaming unit 303c.

The moving unit 303a is configured to move a position of a portion or all of the files from the files to be managed, according to a moving operation to the files to be managed.

The deleting unit 303b is configured to delete a portion or all of the files from the files to be managed, according to a deleting operation to the files to be managed.

The renaming unit 303c is configured to rename a portion or all of the files from the files to be managed, according to a renaming operation to the files to be managed. The first pre-set operation can include touching or hovering.

As disclosed, on a touch screen, whether a duration time of a first pre-set operation to a target file is greater than a first pre-set threshold value can be detected. When the duration time of the first pre-set operation to the target file is detected greater than the first pre-set threshold value, the target file, and other files related to the target file and on an interface of the target file can be determined as files to be managed. According to a second pre-set operation to the files to be managed, a corresponding management to the files to be managed can be performed. The disclosed embodiments can solve problems that multiple operations need to be repeated one after another, when multiple files need a same managing operation on a current interface. The disclosed embodiments can reduce operations and operational time of the user on the touch screen.

Figure 12:
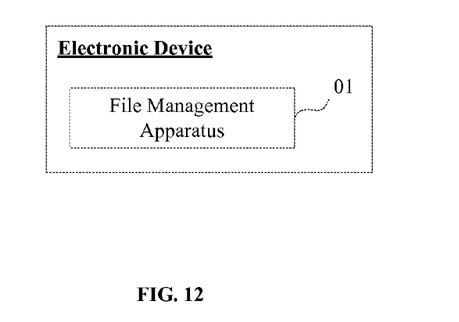
FIG. 12 depicts an exemplary electronic device in accordance with various disclosed embodiments.

FIG. 12 depicts an exemplary electronic device in accordance with various disclosed embodiments. The electronic device includes, e.g., the apparatus 01 as depicted in FIGS. 10-11.

As disclosed, on a touch screen, whether a duration time of a first pre-set operation to a target file is greater than a first pre-set threshold value can be detected. When the duration time of the first pre-set operation to the target file is detected greater than the first pre-set threshold value, the target file, and other files related to the target file and on an interface of the target file can be determined as files to be managed. According to a second pre-set operation to the files to be managed, a corresponding management to the files to be managed can be performed. The disclosed embodiments can solve problems that multiple operations need to be repeated one after another, when multiple files need a same managing operation on a current interface. The disclosed embodiments can reduce operations and operational time of the user on the touch screen.

It should be noted that, in the present disclosure each embodiment is progressively described, i.e., each embodiment is described and focused on difference between embodiments. Similar and/or the same portions between various embodiments can be referred to with each other. In addition, exemplary apparatus is described with respect to corresponding methods.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

A person of ordinary skill in the art can understand that the modules included herein are described according to their functional logic, but are not limited to the above descriptions as long as the modules can implement corresponding functions. Further, the specific name of each functional module is used for distinguishing from on another without limiting the protection scope of the present disclosure.

In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

Figure 14:
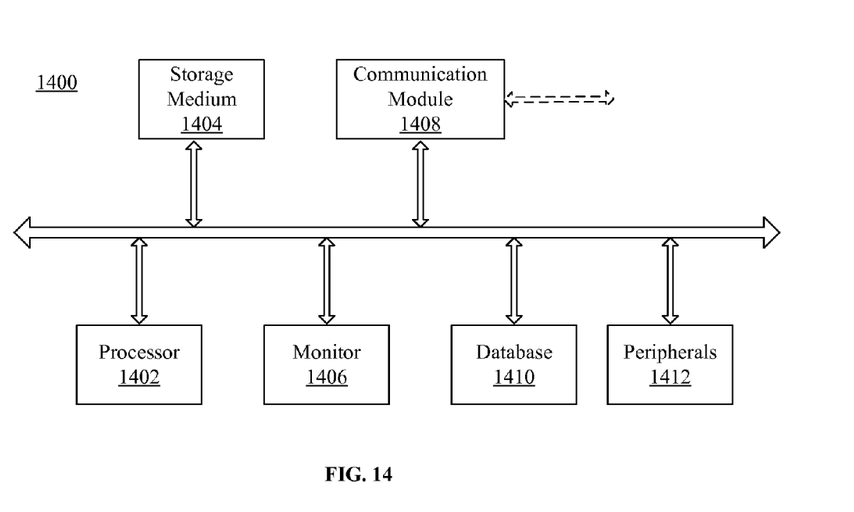
FIG. 14 depicts an exemplary server consistent with the disclosed embodiments.

One of ordinary skill in the art would appreciate that suitable software and/or hardware (e.g., a universal hardware platform) may be included and used in the disclosed methods and systems. For example, the disclosed embodiments can be implemented by hardware only, which alternatively can be implemented by software products only. The software products can be stored in a computer-readable storage medium (e.g., as shown in FIG. 14) including, e.g., ROM/RAM, magnetic disk, optical disk, etc. The software products can include suitable commands to enable a terminal device (e.g., including a mobile phone, a personal computer, or a network device, etc.) to implement the disclosed embodiments.

Figure 13:
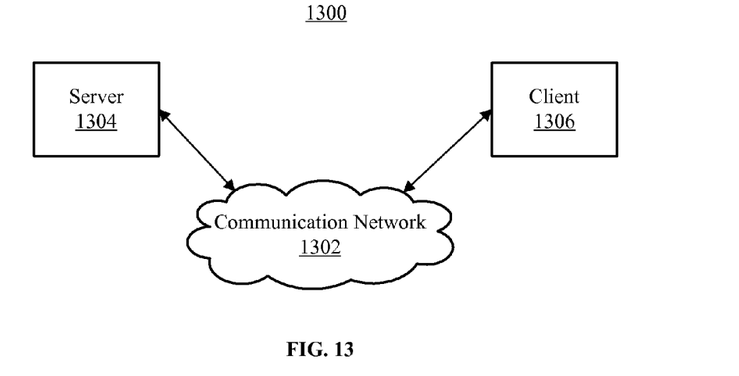
FIG. 13 depicts an exemplary environment incorporating certain disclosed embodiments.

FIG. 13 depicts an exemplary environment 1300 incorporating various disclosed embodiments. As shown in FIG. 13, the environment 1300 may include a server 1304, an electronic device, e.g., a terminal 1306, and/or a communication network 1302. The server 1304 and the terminal 1306 may be coupled through the communication network 1302 for information exchange, such as file transferring, file processing, message processing, and/or instant messaging communication. Although only one terminal 1306 and one server 1304 is shown in the environment 1300, any number of clients 1306 or servers 1304 may be included, and other devices may also be included.

Communication network 1302 may include any appropriate type of communication network for providing network connections to the server 1304 and terminal 1306 or among multiple servers 1304 or clients 1306. For example, communication network 1302 may include the Internet or other types of computer networks or telecommunication networks, either wired or wireless.

The terminal 1306 may refer to any appropriate user terminal with certain computing capabilities, such as a personal computer (PC), a work station computer, a server computer, a hand-held computing device (tablet), a smart phone, or mobile phone, or any other user-side computing device.

The server 1304 may refer to one or more server computers configured to provide certain server functionalities, such as media file pushing, database management, search engines, etc. The server may also include one or more processors to execute computer programs in parallel. For example, the server 1304 may be a public platform server as disclosed herein.

The server 1304 and/or terminal 1306 may be implemented on any appropriate computing platform. FIG. 14 shows a block diagram of an exemplary computing system 1430 capable of implementing the server 1304 and/or terminal 1306.

As shown in FIG. 14, the computing system 1430 may include a processor 1432, a storage medium 1434, a monitor 1436, a communication module 1438, a database 1413, and/or peripherals 1412. Certain devices may be omitted and other devices may be included.

The processor 1432 may include any appropriate processor or processors. Further, processor 1432 can include multiple cores for multi-thread or parallel processing. Storage medium 1434 may include memory modules, such as ROM, RAM, flash memory modules, and erasable and rewritable memory, and mass storages, such as CD-ROM, U-disk, and hard disk, etc. Storage medium 1434 may store computer programs for implementing various processes, when executed by the processor 1432.

Further, the peripherals 1412 may include I/O devices such as keyboard and mouse, and the communication module 1438 may include network devices for establishing connections through the communication network 1302. Database 1413 may include one or more databases for storing certain data and for performing certain operations on the stored data, such as database searching.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, apparatus, and electronic devices for file management are provided. On a touch screen, whether a duration time of a first pre-set operation to a target file is greater than a first pre-set threshold value can be detected. When the duration time of the first pre-set operation to the target file is detected greater than the first pre-set threshold value, the target file, and other files related to the target file and on an interface of the target file can be determined as files to be managed. According to a second pre-set operation to the files to be managed, a corresponding management to the files to be managed can be performed.

The disclosed embodiments can solve problems that multiple operations need to be repeated one after another, when multiple files need a same managing operation on a current interface. The disclosed embodiments can reduce operations and operational time of the user on the touch screen.

What is claimed is:
1. A file managing method comprising:
    detecting whether a duration time of a touch operation performed by a user to a target file on an interface is greater than a first pre-set threshold value;
    when the duration time of the touch operation to the target file is detected greater than the first pre-set threshold value, determining the target file, and other files related to the target file, as files to be managed, wherein the other files related to the target file are at a same row of the target file or at a same column of the target file on the interface; and
    according to a managing operation to the files to be managed, performing a corresponding management to the files to be managed.
2. The method according to claim 1, further including:
    detecting whether the duration time of the touch operation to the target file is greater than a second pre-set threshold value and less than the first pre-set threshold value; and
    when the duration time of the touch operation to the target file is detected greater than the second pre-set threshold value and less than the first pre-set threshold value, determining the target file as the files to be managed, wherein the first pre-set threshold value is greater than the second pre-set threshold value.

3. The method according to claim 1, further including:
  detecting whether the duration time of the touch operation to the target file is greater than a third pre-set threshold value; and
  when the duration time of the touch operation to the target file is detected greater than the third pre-set threshold value, determining the target file to be the files to be managed, wherein the first pre-set threshold value is less than the third pre-set threshold value.

4. The method according to claim 1, wherein the other files related to the target file include:
  other files that are at a same group of the target file; or
  other files having a same type of the target file.

5. The method according to claim 1, wherein the managing operation includes: moving, deleting, or renaming; and
  wherein the performing of the corresponding management to the files to be managed includes:
  moving a position of a portion or all of the files from the files to be managed, according to a moving operation to the files to be managed, or
  deleting a portion or all of the files from the files to be managed, according to a deleting operation to the files to be managed, or
  renaming a portion or all of the files from the files to be managed, according to a renaming operation to the files to be managed.

6. The method according to claim 5, wherein the managing operation is an operation performed uninterruptedly and immediately after the touch operation.

7. The method according to claim 4, wherein the touch operation includes: touching or hovering, and the managing operation is an operation performed uninterruptedly and immediately after the touch operation.

8. A file managing apparatus comprising:
  a first detecting module, configured to detect whether a duration time of a touch operation performed by a user to a target file on an interface is greater than a first pre-set threshold value;
  a first determining module, configured, when the first detecting module detects that the duration time of the touch operation to the target file is greater than the first pre-set threshold value, to determine the target file, and other files related to the target file, as files to be managed, wherein the other files related to the target file are at a same row of the target file or at a same column of the target file on the interface; and
  a managing module, configured to perform a corresponding management to the files to be managed, according to a managing operation to the files to be managed.

9. The apparatus according to claim 8, further including:
  a second detecting module, configured to detect whether the duration time of the touch operation to the target file is greater than a second pre-set threshold value and less than the first pre-set threshold value; and
  a second determining module, configured, when the second detecting module detects that the duration time of the touch operation to the target file is greater than the second pre-set threshold value and less than the first pre-set threshold value, to determine the target file as the files to be managed, wherein the first pre-set threshold value is greater than the second pre-set threshold value.

10. The apparatus according to claim 8, further including:
  a third detecting module, configured to detect whether the duration time of the touch operation to the target file is greater than a third pre-set threshold value; and
  a third determining module configured, when the third detecting module detects that the duration time of the touch operation to the target file is greater than the third pre-set threshold value, to determine the target file as the files to be managed, wherein the first pre-set threshold value is less than the third pre-set threshold value.

11. The apparatus according to claim 8, wherein the other files related to the target file include:
  other files that are at a same group of the target file; or
  other files having a same type of the target file.

12. The apparatus according to claim 8, wherein the managing operation includes: moving, deleting, or renaming, and wherein the managing module includes:
  a moving unit, configured to move a position of a portion or all of the files from the files to be managed, according to a moving operation to the files to be managed;
  a deleting unit, configured to delete a portion or all of the files from the files to be managed, according to a deleting operation to the files to be managed; and
  a renaming module, configured to rename a portion or all of the files from the files to be managed, according to a renaming operation to the files to be managed.

13. The apparatus according to claim 12, wherein the managing operation is an operation performed uninterruptedly and immediately after the touch operation.

14. A non-transitory computer-readable medium having computer program for, when being executed by a processor, performing a file managing method, the method comprising:
  detecting whether a duration time of a touch operation performed by a user to a target file on an interface is greater than a first pre-set threshold value;
  when the duration time of the touch operation to the target file is detected greater than the first pre-set threshold value, determining the target file, and other files related to the target file, as files to be managed, wherein the other files related to the target file are at a same row of the target file or at a same column of the target file on the interface; and
  according to a managing operation to the files to be managed, performing a corresponding management to the files to be managed.

15. The non-transitory computer-readable medium according to claim 14, the method further including:
  detecting whether the duration time of the touch operation to the target file is greater than a second pre-set threshold value and less than the first pre-set threshold value; and
  when the duration time of the touch operation to the target file is detected greater than the second pre-set threshold value and less than the first pre-set threshold value, determining the target file as the files to be managed, wherein the first pre-set threshold value is greater than the second pre-set threshold value.

16. The non-transitory computer-readable medium according to claim 14, the method further including:
  detecting whether the duration time of the touch operation to the target file is greater than a third pre-set threshold value; and
  when the duration time of the touch operation to the target file is detected greater than the third pre-set threshold value, determining the target file to be the files to be managed, wherein the first pre-set threshold value is less than the third pre-set threshold value.

17. The non-transitory computer-readable medium according to claim 14, wherein the other files related to the target file include:
 other files that are at a same group of the target file; or
 other files having a same type of the target file.

18. The non-transitory computer-readable medium according to claim 14, wherein the managing operation includes: moving, deleting, or renaming; and
 wherein the performing of the corresponding management to the files to be managed includes:
 moving a position of a portion or all of the files from the files to be managed, according to a moving operation to the files to be managed, or
 deleting a portion or all of the files from the files to be managed, according to a deleting operation to the files to be managed, or
 renaming a portion or all of the files from the files to be managed, according to a renaming operation to the files to be managed.

\* \* \* \* \*